United States Patent
Manternach et al.

(10) Patent No.: US 11,772,716 B1
(45) Date of Patent: Oct. 3, 2023

(54) SUSPENSION SYSTEM FOR AN OPERATOR STATION OF A WORK VEHICLE

(71) Applicant: DEERE & COMPANY, Moline, IL (US)

(72) Inventors: Byron N. Manternach, Dunkerton, IA (US); Scott A. Tebbe, Cedar Falls, IA (US); Todd W. Rea, Cedar Falls, IA (US); Wen Tsung Lin, Evansdale, IA (US); William K. Rule, Cedar Falls, IA (US); Jacob J. Foxen, Parkersburg, IA (US); Sachidanand Sasidharan, Chennai (IN)

(73) Assignee: DEERE & COMPANY, Moline, IL (US)

( * ) Notice: Subject to any disclaimer, the term of this patent is extended or adjusted under 35 U.S.C. 154(b) by 39 days.

(21) Appl. No.: 17/654,616

(22) Filed: Mar. 14, 2022

(51) Int. Cl.
*B62D 33/06* (2006.01)

(52) U.S. Cl.
CPC .............................. *B62D 33/0604* (2013.01)

(58) Field of Classification Search
CPC ...... B62D 21/11; B62D 21/186; B62D 33/06; B62D 33/0604; B62D 33/0617; B62D 33/071; B60G 13/003; B60G 15/062; B60G 15/063; B60G 99/002; B60G 99/006; E02F 9/16; E02F 9/163; E02F 9/166

See application file for complete search history.

(56) References Cited

U.S. PATENT DOCUMENTS

| | | | |
|---|---|---|---|
| 5,368,118 | A | 11/1994 | Hoefle |
| 6,030,017 | A | 2/2000 | Stojkovic et al. |
| 6,758,294 | B2 | 7/2004 | Peddycord et al. |
| 7,261,365 | B2 | 8/2007 | Dickson et al. |
| 7,744,149 | B2 | 6/2010 | Murray et al. |
| 8,128,155 | B2 | 3/2012 | Ansorge |
| 8,182,024 | B2 | 5/2012 | Hayes et al. |
| 8,807,633 | B2 | 8/2014 | Milburn et al. |
| 8,820,456 | B2 | 9/2014 | Virtanen et al. |
| 8,991,539 | B2 | 3/2015 | Van der Knaap et al. |
| 9,333,992 | B2 | 5/2016 | Kinoshita et al. |
| 9,487,249 | B2 | 11/2016 | Scott et al. |
| 9,556,588 | B2 | 1/2017 | Fujikawa et al. |
| 9,739,338 | B2 | 8/2017 | Hattori |
| 10,215,248 | B2 | 2/2019 | Kosov |
| 10,494,039 | B2 * | 12/2019 | Young ................ B62D 33/0604 |
| 10,549,796 | B2 | 2/2020 | Helm et al. |
| 10,710,645 | B2 | 7/2020 | Keller |

(Continued)

FOREIGN PATENT DOCUMENTS

EP    1645494 A2    4/2006

*Primary Examiner* — Gregory A Blankenship

(57) ABSTRACT

A suspension system for an operator station of a work vehicle having a chassis includes a subframe structure, a plurality of mounting pads, a plurality of shock absorbers, a rear lateral rod, a front stabilizer, and a pitch control stabilizer. The plurality of mounting pads is positioned on a top surface of the subframe structure. The plurality of shock absorbers connects between the chassis and the subframe structure near each of the mounting pads. The rear lateral rod connects to the rear side of the subframe structure and to the chassis. The front stabilizer connects to the front side of the subframe structure and to the chassis. The pitch control stabilizer connects to the right side of the subframe structure and to the chassis.

20 Claims, 9 Drawing Sheets

(56) References Cited

U.S. PATENT DOCUMENTS

| | | | |
|---|---|---|---|
| 10,717,475 B2 | 7/2020 | Manternach et al. | |
| 10,752,298 B2 | 8/2020 | Keller | |
| 10,793,204 B2 | 10/2020 | Manternach et al. | |
| 11,173,969 B2 * | 11/2021 | Soldan | B60G 15/063 |
| 11,203,383 B2 * | 12/2021 | Manternach | B62D 33/0604 |
| 11,203,853 B2 | 12/2021 | Lee | |
| 2018/0186207 A1 * | 7/2018 | Fay, II | F16F 1/00 |
| 2018/0272824 A1 * | 9/2018 | Kerner | B60G 17/0155 |
| 2019/0100255 A1 * | 4/2019 | Benevelli | B60G 99/002 |
| 2019/0193795 A1 * | 6/2019 | Young | B62D 27/04 |
| 2020/0055552 A1 * | 2/2020 | Manternach | B62D 33/0604 |
| 2020/0172177 A1 * | 6/2020 | Manternach | B62D 33/0604 |

* cited by examiner

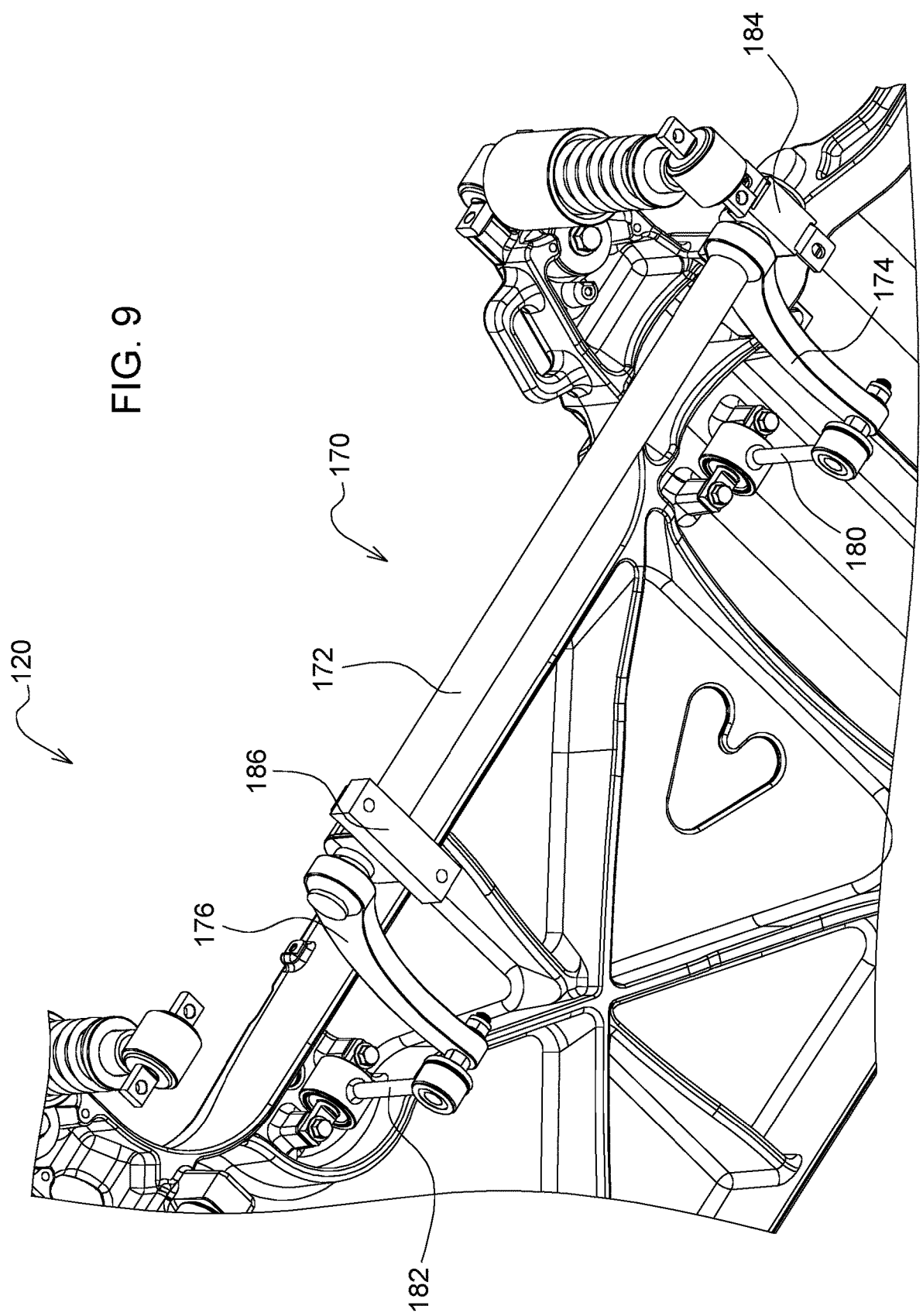

SUSPENSION SYSTEM FOR AN OPERATOR STATION OF A WORK VEHICLE

FIELD OF THE DISCLOSURE

The present disclosure relates to suspension systems for operator stations of work vehicles.

BACKGROUND

Work vehicles, for example agricultural, construction, forestry, and road building vehicles, can operate on uneven terrain or in other environments that produce a significant amount of noise and vibration for the operator. This noise and vibration can make it difficult for operators to select and move controls as desired, and generally make a less than desirable environment for the vehicle operator. Work vehicles are built to withstand rugged conditions and as a result the ride quality for an operator includes undesirable vibrations and noise.

Operators of work vehicles typically work long hours increasing their susceptibility to discomfort and fatigue from a harsh ride quality. Rubber mounts and air cushion isolators have been used with the operator's station to increase operator comfort. However, improvements are desired to further address the inputs that result from the complex motion of a typical work vehicle.

SUMMARY

According to an aspect of the present disclosure, a suspension system for an operator station of a work vehicle having a chassis includes a subframe structure, a plurality of mounting pads, a plurality of shock absorbers, a rear lateral rod, a front stabilizer, and a pitch control stabilizer. The subframe structure extends between a front side, a rear side, a left side, and a right side of the subframe structure. The plurality of mounting pads is positioned on a top surface of the subframe structure. The plurality of mounting pads is configured to support the operator station. The plurality of shock absorbers is connected between the chassis and the subframe structure near each of the mounting pads. The plurality of shock absorbers is configured to allow the operator station to move in a plurality of directions relative to the chassis.

According to an aspect of the present disclosure, the rear lateral rod is connected to the subframe structure near one of the rear left mounting pad and the rear right mounting pad and to the chassis. The rear lateral rod extends laterally across the subframe structure and is configured to control lateral motion of the rear of the suspension system.

According to an aspect of the present disclosure, the front stabilizer includes a left arm connected to the front side of the subframe structure and to the chassis at a location forward of the subframe structure, a right arm connected to the front side of the subframe structure and to the chassis at a location forward of the subframe structure, and a rod connected between the left arm and the right arm at a position between the front side of the subframe structure and the connection location of the chassis. The front stabilizer is configured to control lateral motion of the front of the suspension system and to control longitudinal motion and roll motion of the suspension system.

According to an aspect of the present disclosure, the pitch control stabilizer includes a front arm connected a front connection link, a rear arm connected to a rear connection link, a rod connected between the front arm and the rear arm, a front retainer connecting a front portion of the rod to the chassis, and a rear retainer connecting a rear portion of the rod to the chassis. The front and rear connection links are connected to the subframe structure. The pitch control stabilizer is configured to control the pitch motion of the suspension system.

According to an aspect of the present disclosure, the rear lateral rod is connected to the subframe structure near the rear right mounting pad and to the chassis near the rear left mounting pad.

According to an aspect of the present disclosure, the left arm of the front stabilizer is rotatably connected to the front side of the subframe structure and rotatably connected to the chassis, and the right arm of the front stabilizer is rotatably connected to the front side of the subframe structure and rotatably connected to the chassis.

According to an aspect of the present disclosure, the rod of the front stabilizer is fixedly connected to the left and right arms.

According to an aspect of the present disclosure, the rod is connected between the left arm and the right arm at a position closer to the front side of the subframe structure than the connection location of the chassis.

According to an aspect of the present disclosure, the left and right arms of the front stabilizer are connected to the front of the subframe structure between the front left and right mounting pads.

According to an aspect of the present disclosure, the rod of the pitch control stabilizer is fixedly connected to the front and rear arms of the pitch control stabilizer.

According to an aspect of the present disclosure, the front connection link is rotatably connected to the front arm and the subframe structure, and the rear connection link is rotatably connected to the rear arm and the subframe structure.

According to an aspect of the present disclosure, the front connection link rotatably connects to the subframe structure near the front right mounting pad, and the rear connection link rotatably connects to the subframe structure at a location between a midpoint and the rear side of the subframe structure.

According to an aspect of the present disclosure, the front retainer connects to the rod at a position forward of the front arm, and the rear retainer connects to the rod at a position forward of the rear arm.

According to an aspect of the present disclosure, a work vehicle can include any implementation of the suspension system disclosed herein.

The above and other features will become apparent from the following detailed description and accompanying drawings.

BRIEF DESCRIPTION OF THE DRAWINGS

The detailed description of the drawings refers to the accompanying figures in which:

FIG. 9 is a bottom perspective view of a suspension system, according to an implementation.

Like reference numerals are used to indicate like elements throughout the several figures.

DETAILED DESCRIPTION

The implementations disclosed in the above drawings and the following detailed description are not intended to be exhaustive or to limit the disclosure to these implementations.

Figure 1:
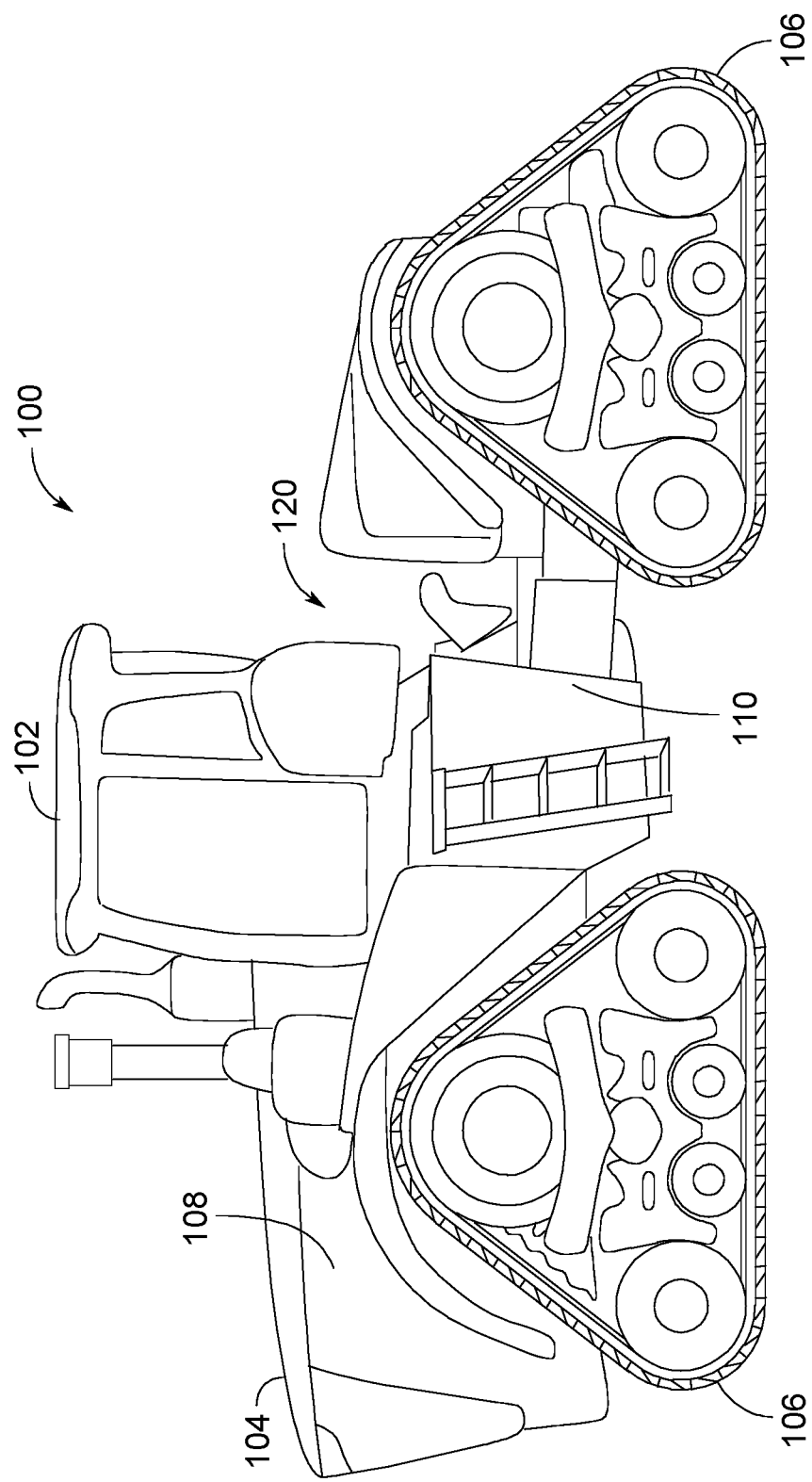
FIG. 1 is a side view of a work vehicle including a suspension system for an operator station, according to an implementation.

FIG. 1 illustrates a work vehicle 100, for example an agricultural tractor. This disclosure also applies to other types of work vehicles in agriculture, construction, forestry, and road building. The work vehicle 100 can include an operator station or cab 102, a hood 104, one or more ground engaging apparatus 106, for example wheels or track assemblies, and a frame or chassis 110. The work vehicle 100 can have a rigid or an articulated frame 110. The work vehicle 100 can include one or more power sources 108, for example an internal combustion engine, a hybrid engine, or an electric or hydraulic machine. The work vehicle 100 can include a suspension system 120 for an operator station 102.

Figure 2:
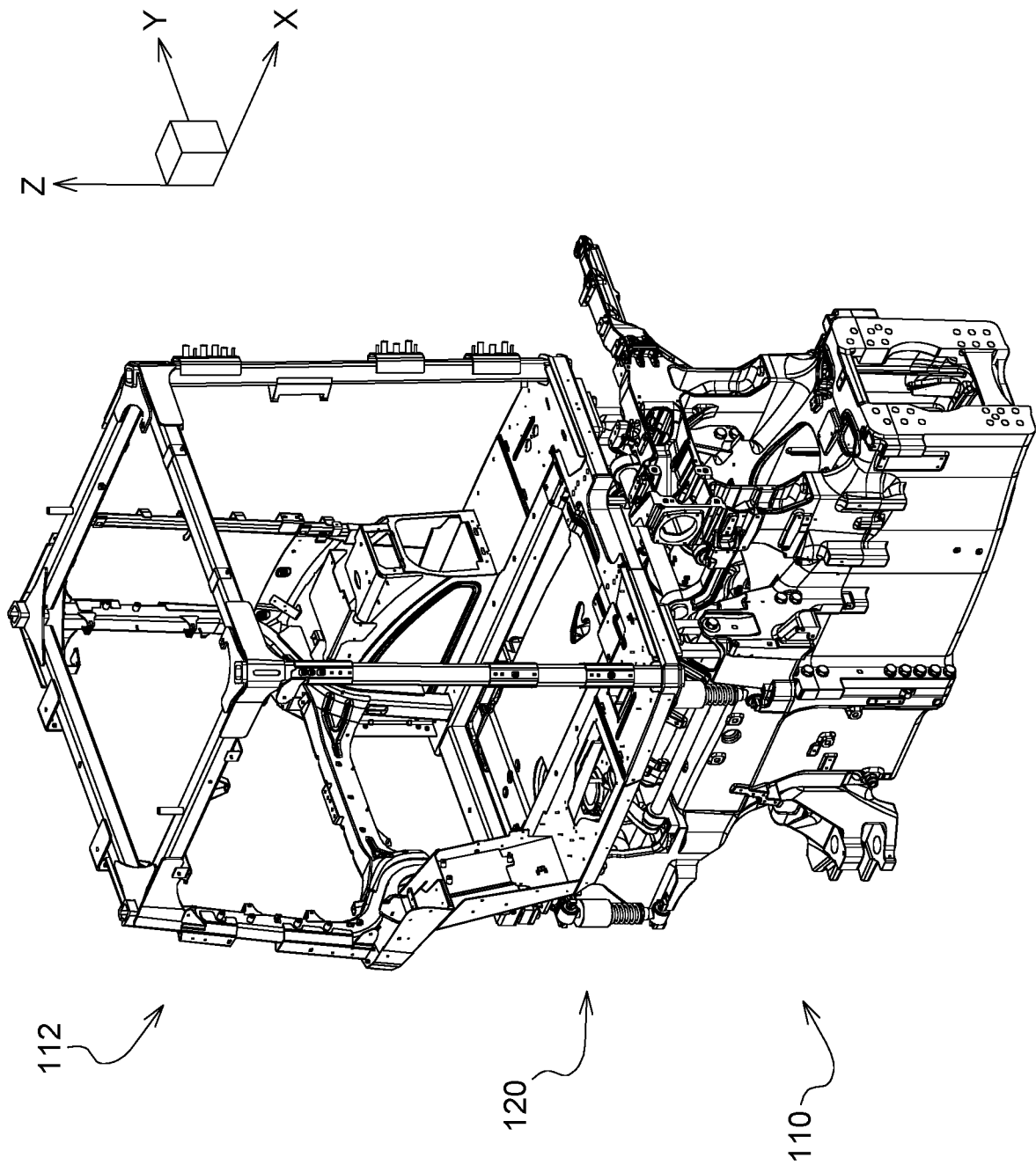
FIG. 2 is a right perspective view a suspension system connected to an operator station frame and a chassis, according to an implementation.
Figure 3:
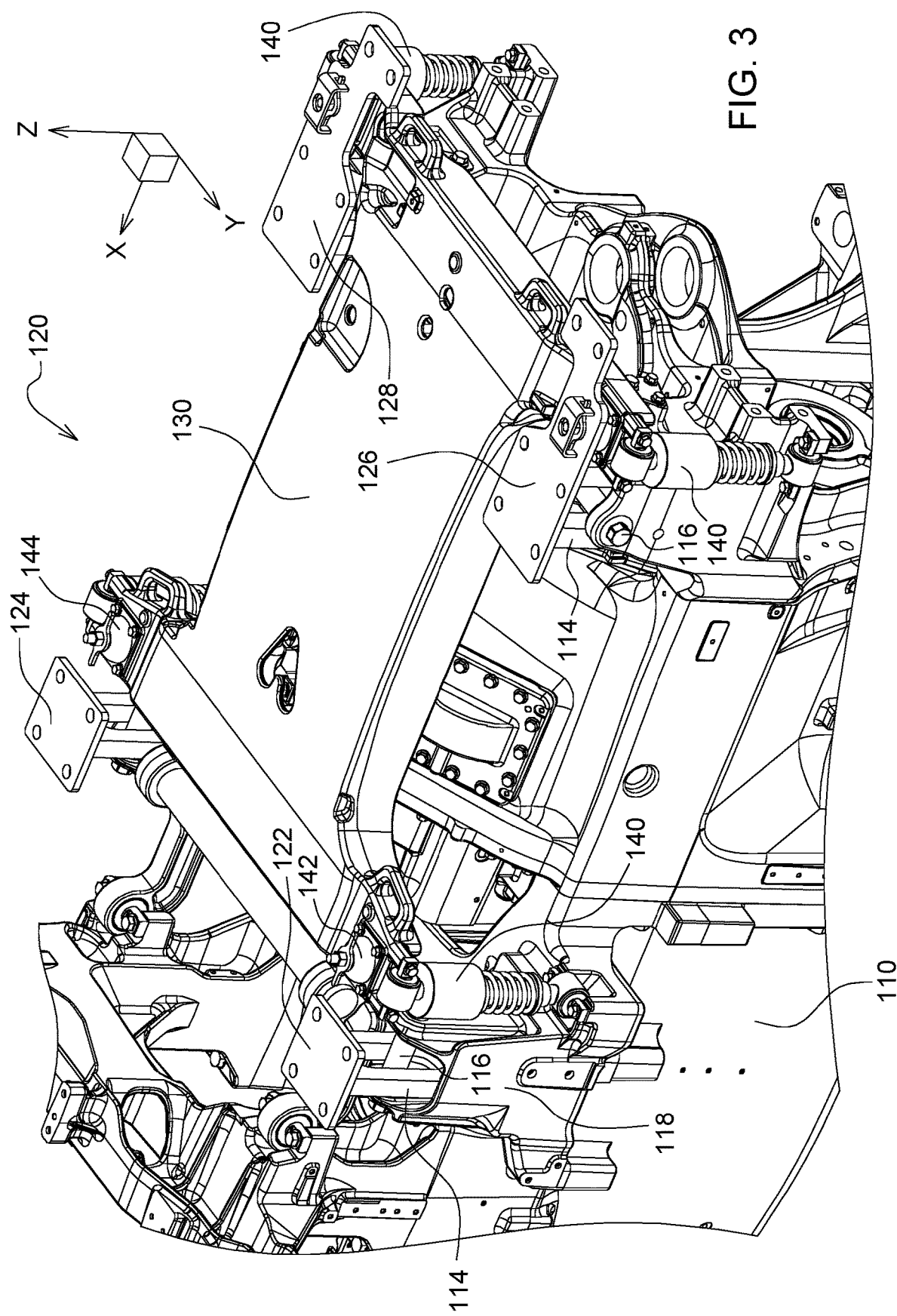
FIG. 3 is a left perspective view of a suspension system connected to a chassis, according to an implementation.
Figure 4:
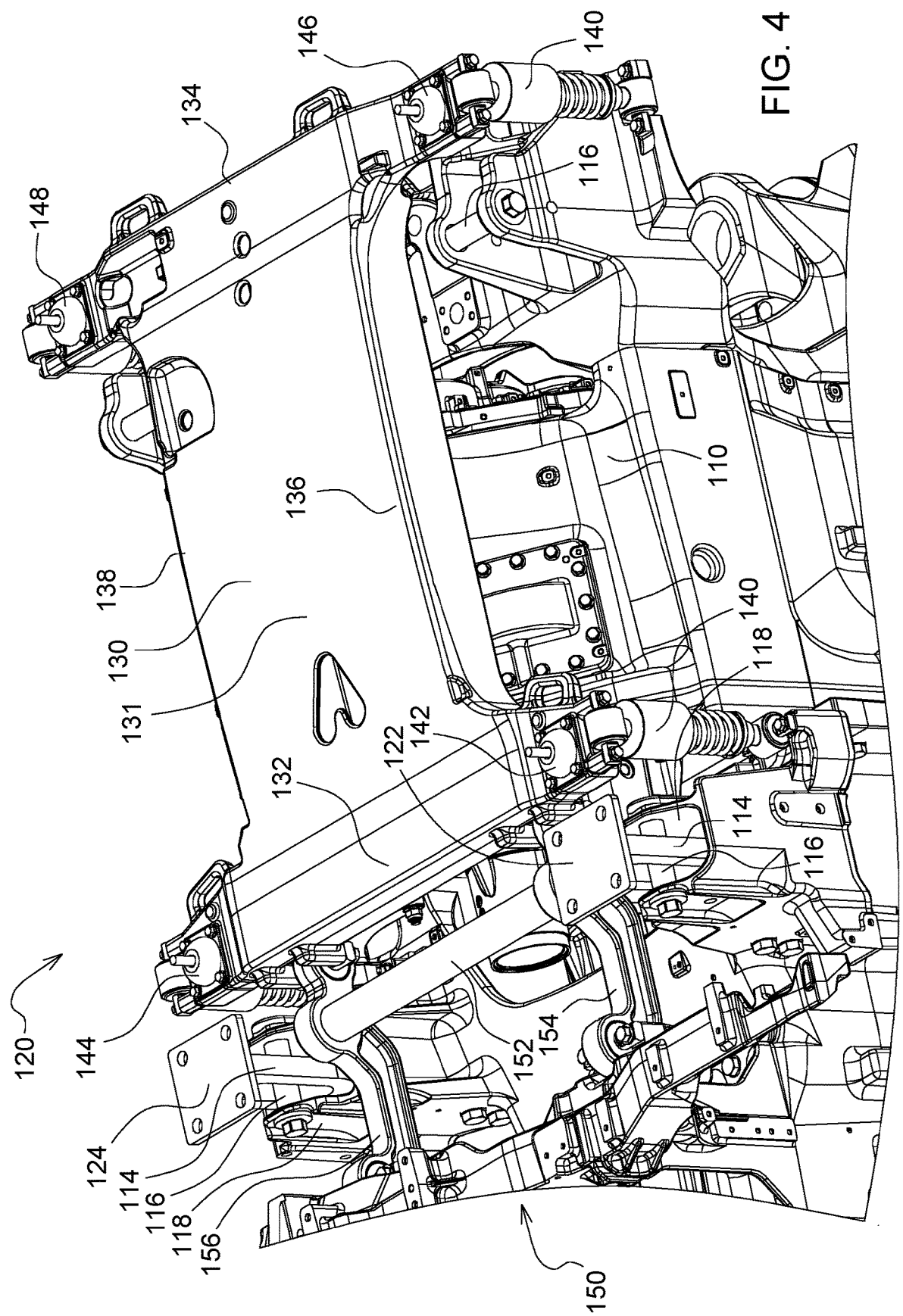
FIG. 4 is a top perspective view of a suspension system connected to a chassis, according to an implementation.
Figure 5:
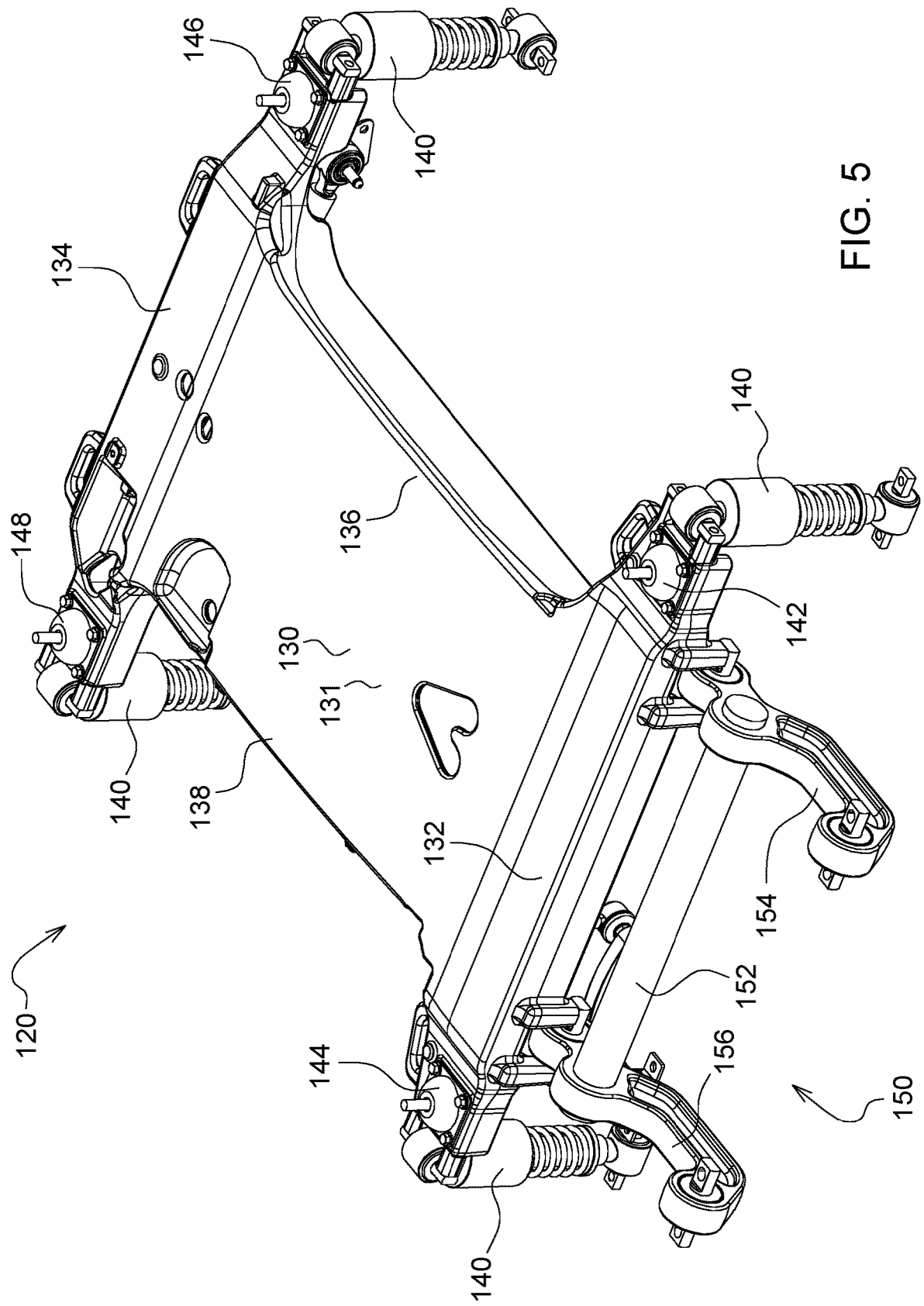
FIG. 5 is a front perspective view of a suspension system, according to an implementation.
Figure 6:
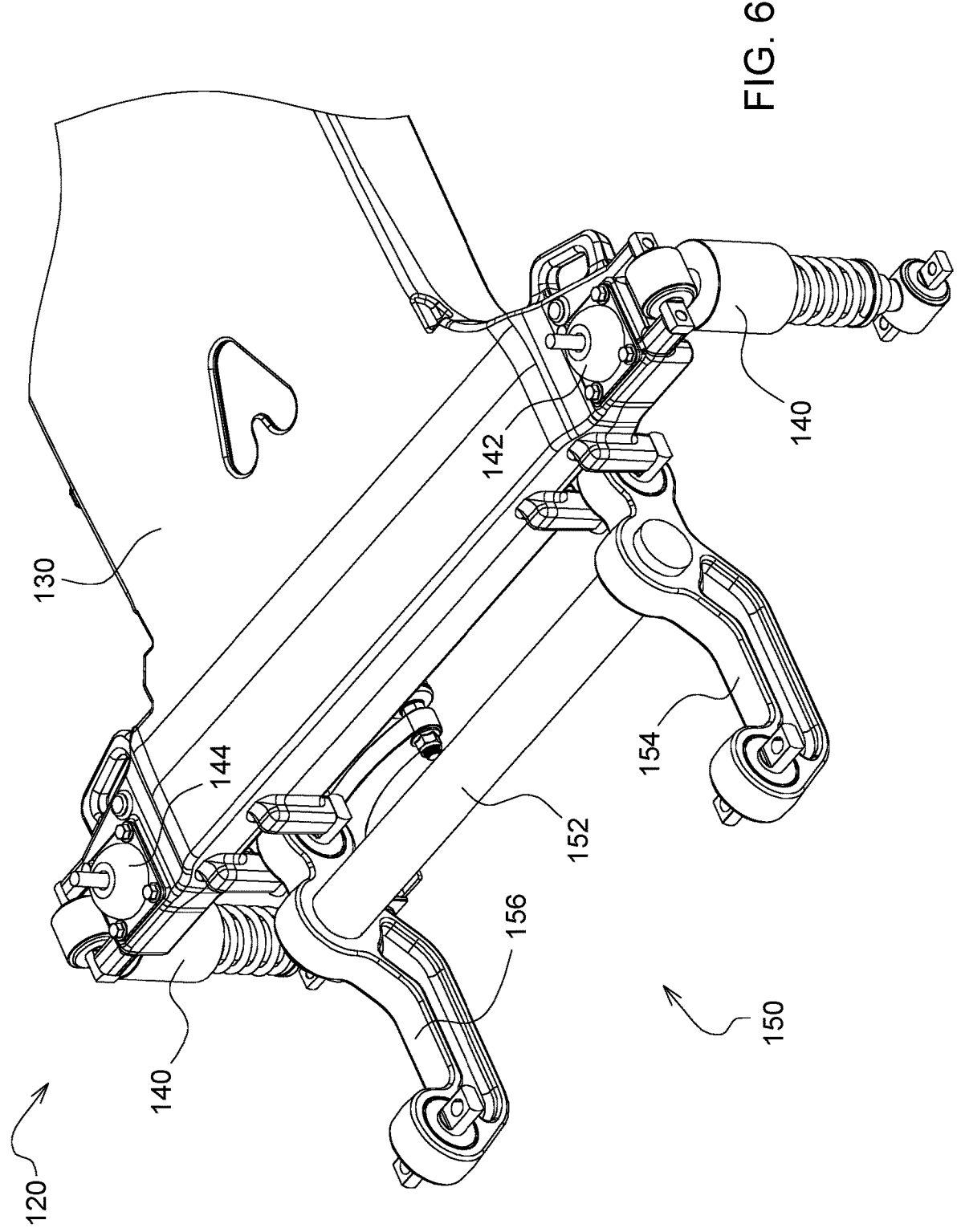
FIG. 6 is a front perspective view of a suspension system, according to an implementation.
Figure 7:
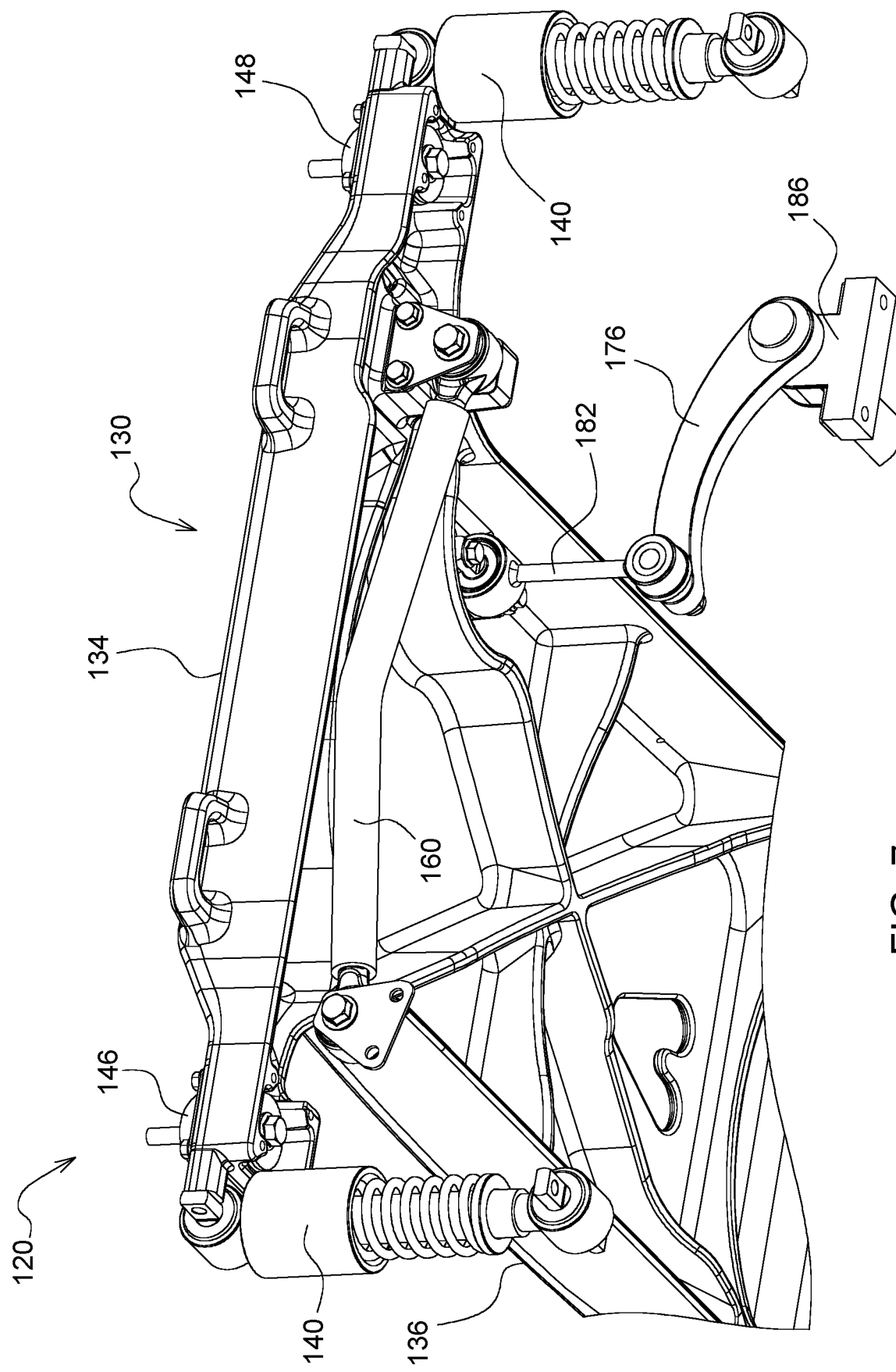
FIG. 7 is a bottom perspective view of a suspension system, according to an implementation.
Figure 8:
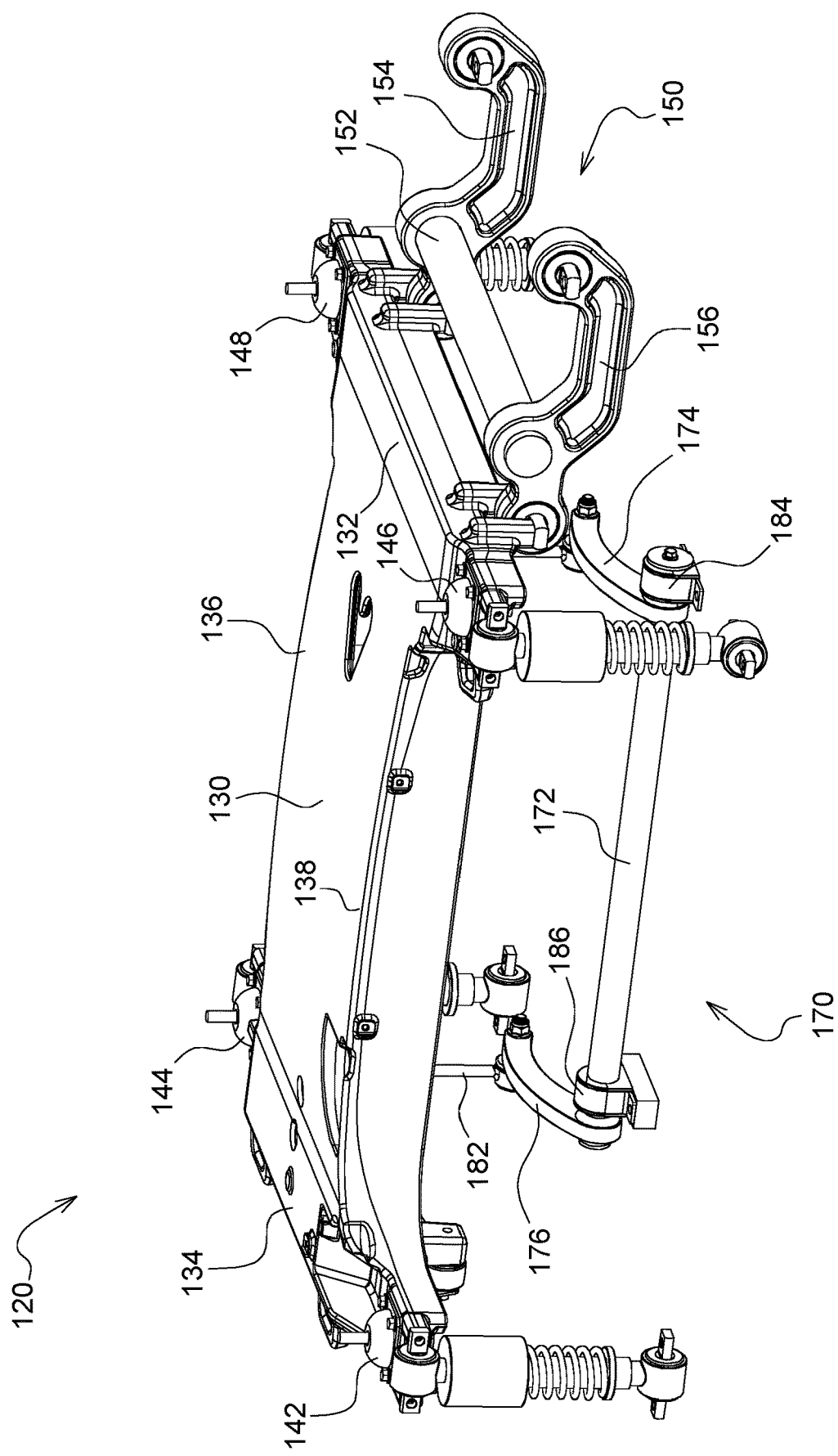
FIG. 8 is a right perspective view of a suspension system, according to an implementation.

With reference to FIG. 2, an operator station frame 112 is connected to a work vehicle chassis 110 by a suspension system 120. The operator station frame 112 provides a support structure for an operator station 102, commonly referred to as a vehicle cab. In general, the z-axis is in the vertical direction representing up-down direction movement; the x-axis is in a longitudinal direction representing forward-reverse direction movement; and the y-axis is in a transverse direction representing lateral or right-left direction movement. The operator station frame 112 is attached to the suspension system 120 at multiple locations. The suspension system 120 is positioned between the operator station frame 112 and the chassis 110.

With reference to FIGS. 3-9, a suspension system 120 controls or limits motion of an operator station 102 within predetermined or prescribed limits or parameters. The suspension system 120 includes a subframe structure 130 connected to the chassis 110. The subframe structure 130 includes a rigid main body 131 extending between a front side 132, a rear side 134, a left side 136, and a right side 138 of the subframe structure 130. The main body 131 forms a top surface and a bottom surface within an interior of the boundary defined by the sides 132, 134, 136, 138 of the subframe structure 130.

The subframe structure 130 includes a plurality of mounting pads positioned on the top surface of the subframe structure 130. The top surface can include a mounting pad at or near each corner of the main body 131 to support the operator station frame 112. The top surface can include a front left mounting pad 142, a front right mounting pad 144, a rear left mounting pad 146, and a rear right mounting pad 148. The mounting pads 142, 144, 146, 148 can be pivotally or fixedly attached to a top surface of the main body 131 or can be integral with the subframe structure 130. The main body 131 extends between and directly connects the mounting pads 142, 144, 146, 148 to each other. The mounting pads 142, 144, 146, 148 have a mounting surface for supporting the operator station frame 112. The mounting pads 142, 144, 146, 148 can each include an isolator, such as a resilient or damping member.

The suspension system 120 can include a front left bracket 122, front right bracket 124, rear left bracket 126, and rear right bracket 128. Each of these brackets 122, 124, 126, 128 can provide an attachment location for the operator station frame 112. The front left bracket 122 can be positioned near or adjacent to the front left mounting pad 132. The front right bracket 124 can be positioned near or adjacent to the front right mounting pad 134. The rear left bracket 126 can be positioned near or adjacent the rear left mounting pad 146. The rear left bracket 126 can be attached to the rear left mounting pad 146. The rear right bracket 128 can be positioned near or adjacent the rear right mounting pad 148. The rear right bracket 128 can be attached to the rear right mounting pad 148.

The suspension system 120 can include limits or motion constraints to limit or constrain the motion of the suspension system 120 within predetermined parameters or boundaries. Any or all of the brackets 122, 124, 126, 128 can include a concave or U-shaped stop member 114. Alternatively, or additionally, the subframe structure 130 could include one or more stop members 114 at various locations. A cross pin 116 is positioned within each stop member 114 and is attached to the chassis 110. When each of the brackets 122, 124, 126, 128 are attached to the operator station frame 112 and each bracket includes a stop member 114 having a cross pin 116 attached to the chassis 110, then the stop member 114 limits or constrains the relative motion between the operator station frame 112 and the chassis 110 by limiting or constraining the relative motion of the cross pin 116 within the boundaries or confines of the stop member 114. Brackets 118 can attach the cross pins 116 to the chassis 110.

The suspension system 120 includes shock absorbers 140 connecting the subframe structure 130 to the chassis 110. The shock absorbers 140 can connect between the subframe structure 130 and the chassis 110 at or near each of the mounting pads 142, 144, 146, 148. The shock absorbers 140 can include springs and dampers in the form of spring over damper assemblies. In other implementations, the shock absorbers 140 can take various other forms, such as separate springs and dampers, or any other resilient or damping apparatus utilized separately or in combination. The shock absorbers 140 allow the operator station frame 112 to move in a plurality of directions (e.g., up, down, left, right, forward, backward, pitch, yaw, roll, etc.) relative to the chassis 110. The shock absorbers 140 pivotally connect to the subframe structure 130 and the chassis 110. The shock absorbers 140 can include bushings at the pivotal connections to provide additional damping. The shock absorbers 140 can include brackets at each end to connect to the subframe structure 130 and the chassis 110.

The suspension system 120 includes a front stabilizer 150 connected to the front side 132 of the subframe assembly 130 and to the chassis 110. The front stabilizer 150 can connect to the front side 132 of the subframe assembly 130 between the front left mounting pad 142 and the front right mounting pad 144. The front stabilizer 150 extends forward of the subframe structure 130 and connects to the chassis at a location forward of the front side 132 of the subframe assembly 130. The front stabilizer 150 can include a shaft, bar, or rod 152, a left extension or arm 154, and a right extension or arm 156. A first end of the left arm 154 can rotatably connect to the front of the subframe structure 130 inboard of the front left mounting pad 142. A second end of the left arm 154 can rotatably connect to the chassis 110 forward of the subframe structure 130. A first end of the right arm 156 can rotatably connect to the front of the subframe structure 130 inboard of the right front mounting pad 144. A second end of the right arm 156 can rotatably connect to the chassis 110 forward of the subframe structure 130.

The rod 152 extends between and is connected to the left and right arms 154, 156. The rod 152 can be fixedly connected to the left and right arms 154, 156. The rod 152 connects to the left and right arms 154, 156 at a position between the first and second ends of the left and right arms 154, 156. The rod 152 can connect to the left and right arms 154, 156 at a position closer to the first ends of the left and right arms 154, 156. The rod 152 can connect to the left and right arms 154, 156 at a position closer to the front of the subframe structure 130 than the connection location of the left and right arms 154, 156 to the chassis 110.

The front stabilizer 150 provides lateral motion control (movement left and right) at the front of the suspension system 120. The front stabilizer 150 controls or limits the left and right motion at the front of the subframe structure 130. The front stabilizer 150 provides longitudinal motion control (movement forward and rearward) for the suspension system 120. The front stabilizer 150 controls or limits the forward and rear motion of the subframe structure 130. The front stabilizer 150 provides roll control or stability (movement around the x-axis) for the suspension system 120. The front stabilizer 150 controls or limits the rotation about the x-axis (longitudinal axis) at the front of the subframe structure 130. The front stabilizer controls or limits the rate and magnitude of motion in the various directions within predetermined parameters.

The suspension system 120 includes a rear panhard rod or rear lateral rod 160 connected to the rear side 134 subframe structure 130 and to the chassis 110. The rear lateral rod 160 can connect to the subframe structure 130 near or in the vicinity of the rear right mounting pad 148 at one end and to the chassis 110 near or in the vicinity of the rear left mounting pad 146 at the other end. Alternatively, the rear lateral rod 160 is connected to the subframe structure 130 near or in the vicinity of the rear left mounting pad 146 at one end and to the chassis 110 near or in the vicinity of the rear right mounting pad 148 at the other end. The rear lateral rod 160 can connect to the bottom surface of the subframe structure 130. The rear lateral rod 160 extends along the rear of the subframe structure 130 and provides lateral motion control (movement left and right) at the rear of the suspension system 120. The rear lateral rod 160 controls or limits the left and right motion at the rear of the subframe structure 130. The rear lateral rod controls or limits the rate and magnitude of the motion within predetermined parameters. Each end of the rear lateral rod 160 can include a bushing at the connection locations.

The suspension system 120 includes a pitch control stabilizer 170 connected to the right side 138 of the subframe structure 130 and to the chassis 110. The pitch control stabilizer 170 can connect to the subframe structure 130 with a front connection link 180 and a rear connection link 182. The front and rear connections links 180, 182 can rotatably connect to the bottom surface of the subframe structure 130. The front and rear connections links 180, 182 can include bushings at each connection location. The pitch control stabilizer 170 includes a shaft, bar, or rod 172, a front extension or arm 174 connected to a first end of the rod 172, and a rear extension or arm 176 connected to a second end of the rod 172. The rod 172 operates to resist torsion. The front and rear arms 174, 176 can be fixedly connected to the rod 172 or can be integral with the rod 172.

A first end of the front connection link 180 can rotatably connect to the front arm 174, and a second end of the front connection link 180 can rotatably connect to the subframe structure 130 near the front right mounting pad 144. A first end of the rear connection link 182 can rotatably connect to the rear arm 176, and a second end rear connection link 182 can rotatably connect to the right side 138 of the of the subframe structure 130 at a location between the midpoint and the rear side 134 of the subframe structure 130. The second end rear connection link 182 can rotatably connect to the right side 138 of the of the subframe structure 130 at a location spaced apart from the rear side 134 of the subframe structure 130.

The pitch control stabilizer 170 can connect to the chassis 110 with a front retainer 184 positioned forward of the front arm 174 and a rear retainer 186 positioned forward of the rear arm 176. The front retainer 184 connects a front portion of the rod 172 to the chassis 110, and the rear retainer 186 connects a rear portion of the rod 172 to the chassis 110. The front and rear retainers 184, 186 surround or enclose the rod 172. The front and rear retainers 184, 186 can include bushings. The front and rear arms 174, 176 operate as lever arms which rotate in opposite directions twisting the rod 172 as the suspension system 120 pitches forward or rearward. The rod 172 has a selected amount of resistance to twisting or torsion which reduces the rate and magnitude of pitching motion. The pitch control stabilizer 170 provides pitch control (movement around the y-axis) to the suspension system 120. The pitch control stabilizer 170 controls or limits the rotation of the subframe structure 130 about the y-axis (lateral or transverse axis). The pitch control stabilizer 170 controls or limits the forward and rearward pitch rate and magnitude of the suspension system 120 within predetermined parameters.

According to some implementations, one or more of the components described herein are excluded from the suspension system 120. According to other implementations, additional components are added to the suspension system 120. According to other implementations, one or more of these components described herein are excluded from the suspension system 120 and one or more other components are added to the suspension system 120. Many other variations are contemplated and are within the scope of this disclosure.

Without in any way limiting the scope, interpretation, or application of the claims appearing below, a technical effect of one or more of the example implementations disclosed herein is a suspension system for an operator station which can dampen the vibration from the chassis of the vehicle to the operator station. Another technical effect of one or more of the example implementations disclosed herein is a suspension system for an operator station which can control or limit motion within predetermined or prescribed limits or parameters.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may be comprised of any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example implementations of the present disclosure, these descriptions should not be viewed in a restrictive or limiting sense. Rather, there are several variations and modifications which may be made without departing from the scope of the appended claims.

What is claimed is:

1. A suspension system for an operator station of a work vehicle having a chassis, the suspension system comprising:
    a subframe structure extending between a front side, a rear side, a left side, and a right side of the subframe structure;
    a plurality of mounting pads including a front left mounting pad, a front right mounting pad, a rear left mounting pad, and a rear right mounting pad, the plurality of mounting pads positioned on a top surface of the subframe structure and configured to support the operator station;
    a plurality of shock absorbers connected between the chassis and the subframe structure near each of the mounting pads, the plurality of shock absorbers configured to allow the operator station to move in a plurality of directions relative to the chassis;
    a rear lateral rod connected to the subframe structure near one of the rear left mounting pad and the rear right mounting pad and to the chassis, the rear lateral rod extending laterally across the subframe structure and configured to control lateral motion of the rear of the suspension system;
    a front stabilizer including a left arm connected to the front side of the subframe structure and to the chassis at a location forward of the subframe structure, a right arm connected to the front side of the subframe structure and to the chassis at a location forward of the subframe structure, and a rod connected between the left arm and the right arm at a position between the front side of the subframe structure and the connection location of the chassis, the front stabilizer configured to control lateral motion of the front of the suspension system and to control longitudinal motion and roll motion of the suspension system;
    a pitch control stabilizer including a front arm connected to a front connection link, a rear arm connected to a rear connection link, a rod connected between the front arm and the rear arm, a front retainer connecting a front portion of the rod to the chassis, and a rear retainer connecting a rear portion of the rod to the chassis, the front and rear connection links connected to the subframe structure, the pitch control stabilizer configured to control the pitch motion of the suspension system.

2. The suspension system of claim 1, wherein the rear lateral rod is connected to the subframe structure near the rear right mounting pad and to the chassis near the rear left mounting pad.

3. The suspension system of claim 1, wherein the left arm of the front stabilizer is rotatably connected to the front side of the subframe structure and rotatably connected to the chassis, and the right arm of the front stabilizer is rotatably connected to the front side of the subframe structure and rotatably connected to the chassis.

4. The suspension system of claim 1, wherein the rod of the front stabilizer is fixedly connected to the left and right arms.

5. The suspension system of claim 1, wherein the rod is connected between the left arm and the right arm at a position closer to the front side of the subframe structure than the connection location of the chassis.

6. The suspension system of claim 1, wherein the left and right arms of the front stabilizer are connected to the front of the subframe structure between the front left and right mounting pads.

7. The suspension system of claim 1, wherein the rod of the pitch control stabilizer is fixedly connected to the front and rear arms of the pitch control stabilizer.

8. The suspension system of claim 1, wherein the front connection link is rotatably connected to the front arm and the subframe structure, and the rear connection link is rotatably connected to the rear arm and the subframe structure.

9. The suspension system of claim 1, wherein the front connection link rotatably connects to the subframe structure near the front right mounting pad, and the rear connection link rotatably connects to the subframe structure at a location between a midpoint and the rear side of the subframe structure.

10. The suspension system of claim 1, wherein the front retainer connects to the rod at a position forward of the front arm, and the rear retainer connects to the rod at a position forward of the rear arm.

11. A work vehicle having a chassis and a suspension system for an operator station, comprising:
    a subframe structure extending between a front side, a rear side, a left side, and a right side of the subframe structure;
    a plurality of mounting pads including a front left mounting pad, a front right mounting pad, a rear left mounting pad, and a rear right mounting pad, the plurality of mounting pads positioned on a top surface of the subframe structure and configured to support the operator station;
    a plurality of shock absorbers connected between the chassis and the subframe structure near each of the mounting pads, the plurality of shock absorbers configured to allow the operator station to move in a plurality of directions relative to the chassis;
    a rear lateral rod connected to the subframe structure near one of the rear left mounting pad and the rear right mounting pad and to the chassis, the rear lateral rod extending laterally across the subframe structure and configured to control lateral motion of the rear of the suspension system;
    a front stabilizer including a left arm connected to the front side of the subframe structure and to the chassis at a location forward of the subframe structure, a right arm connected to the front side of the subframe structure and to the chassis at a location forward of the subframe structure, and a rod connected between the left arm and the right arm at a position between the front side of the subframe structure and the connection location of the chassis, the front stabilizer configured to control lateral motion of the front of the suspension system and to control longitudinal motion and roll motion of the suspension system;

a pitch control stabilizer including a front arm connected to a front connection link, a rear arm connected to a rear connection link, a rod connected between the front arm and the rear arm, a front retainer connecting a front portion of the rod to the chassis, and a rear retainer connecting a rear portion of the rod to the chassis, the front and rear connection links connected to the subframe structure, the pitch control stabilizer configured to control the pitch motion of the suspension system.

12. The work vehicle of claim 11, wherein the rear lateral rod is connected to the subframe structure near the rear right mounting pad and to the chassis near the rear left mounting pad.

13. The work vehicle of claim 11, wherein the left arm of the front stabilizer is rotatably connected to the front side of the subframe structure and rotatably connected to the chassis, and the right arm of the front stabilizer is rotatably connected to the front side of the subframe structure and rotatably connected to the chassis.

14. The work vehicle of claim 11, wherein the rod of the front stabilizer is fixedly connected to the left and right arms.

15. The work vehicle of claim 11, wherein the rod is connected between the left arm and the right arm at a position closer to the front side of the subframe structure than the connection location of the chassis.

16. The work vehicle of claim 11, wherein the left and right arms of the front stabilizer are connected to the front of the subframe structure between the front left and right mounting pads.

17. The work vehicle of claim 11, wherein the rod of the pitch control stabilizer is fixedly connected to the front and rear arms of the pitch control stabilizer.

18. The work vehicle of claim 11, wherein the front connection link is rotatably connected to the front arm and the subframe structure, and the rear connection link is rotatably connected to the rear arm and the subframe structure.

19. The work vehicle of claim 11, wherein the front connection link rotatably connects to the subframe structure near the front right mounting pad, and the rear connection link rotatably connects to the subframe structure at a location between a midpoint and the rear side of the subframe structure.

20. The work vehicle of claim 11, wherein the front retainer connects to the rod at a position forward of the front arm, and the rear retainer connects to the rod at a position forward of the rear arm.

* * * * *